United States Patent [19]
Olinger

[11] Patent Number: 5,633,077
[45] Date of Patent: May 27, 1997

[54] INFRARED RADIATION BLOCKING INSULATION PRODUCT

[75] Inventor: John L. Olinger, Newark, Ohio

[73] Assignee: Owens-Corning Fiberglas Technology, Inc., Summit, Ill.

[21] Appl. No.: 393,789

[22] Filed: Feb. 24, 1995

[51] Int. Cl.$^6$ .................................... D04H 1/58
[52] U.S. Cl. ................. 442/131; 428/74; 428/913; 528/168; 528/399; 442/132; 442/133; 442/327; 442/394
[58] Field of Search ............. 428/74, 286, 285, 428/288, 290, 913; 528/168, 399

[56] References Cited

U.S. PATENT DOCUMENTS

| | | | |
|---|---|---|---|
| H1309 | 5/1994 | Allen et al. . | |
| Re. 34,726 | 9/1994 | Wand et al. . | |
| 3,883,451 | 5/1975 | Reynard et al. | 528/399 |
| 4,243,460 | 1/1981 | Nagler | 156/275 |
| 4,471,015 | 9/1984 | Ebneth et al. | 428/195 |
| 4,520,066 | 5/1985 | Athey | 428/288 |
| 4,776,142 | 10/1988 | Hardesty | 52/407 |
| 4,924,650 | 5/1990 | Dallüge . | |
| 4,948,922 | 8/1990 | Varadan et al. . | |
| 5,079,334 | 1/1992 | Epstein et al. | 528/250 |
| 5,098,735 | 3/1992 | Henry . | |
| 5,099,242 | 3/1992 | Jaggard et al. . | |
| 5,137,782 | 8/1992 | Adriaensen et al. . | |
| 5,147,694 | 9/1992 | Clarke . | |
| 5,185,381 | 2/1993 | Ruffoni . | |
| 5,226,210 | 7/1993 | Koskenmaki et al. . | |
| 5,275,874 | 1/1994 | Brandenburg et al. | 428/288 |
| 5,277,955 | 1/1994 | Schelhorn et al. . | |
| 5,290,440 | 3/1994 | Pirkle et al. . | |
| 5,349,100 | 9/1994 | Mintz . | |
| 5,399,423 | 3/1995 | McCullough et al. | 428/287 |

FOREIGN PATENT DOCUMENTS

| | | |
|---|---|---|
| 3146017 | 5/1983 | Germany . |
| 4406613 | 10/1994 | Germany . |
| 2213479 | 8/1989 | United Kingdom . |
| 2282145 | 3/1995 | United Kingdom . |

OTHER PUBLICATIONS

Derwent AN 92-354402 (1992, week 43), abstract of JP 425794 (Sep. 11, 1992).

Bradley, "A New Twist in the Tale of Nature's Asymmetry," *Science*, vol. 264, May 13, 1994, p. 908.

Lakhtakia et al., *Lecture Notes in Physics* 335, "Time-Harmonic Electromagnetic Fields in Chiral Media," 1989, Springer-Verlag, pp. 1–5.

Kaner et al., "Plastics That Conduct Electricity," 1994 or earlier.

Varadan et al., "Measurement of the Electromagnetic Properties of Chiral Composite Materials . . . ," *Radio Science*, vol. 29, No. 1, Jan.–Feb. 1994.

Allock, "Cross-Linking Reactions for the Conversion of Polyphosphazenes into Useful Materials," *Chem. Mater.* vol. 6, No. 9, 1994, pp. 1476–1491.

*Primary Examiner*—Kathleen Choi
*Attorney, Agent, or Firm*—C. Michael Gegenheimer; Linda S. Evans

[57] ABSTRACT

A thermal insulation product which effectively blocks the transmission of infrared radiation through the product is provided and includes, in combination, an insulating material and a chiral polymer adapted to block the passage of infrared radiation through the insulating material.

9 Claims, 2 Drawing Sheets

INFRARED RADIATION BLOCKING INSULATION PRODUCT

BACKGROUND OF THE INVENTION

This invention relates to insulation products which include an infrared radiation blocking agent, and more particularly to insulation products which include chiral materials designed to block the transmission of infrared radiation.

Insulation products are designed to prevent or at least reduce heat flow between two surfaces. It is well known in the art that use is made of glass or other mineral, organic, or natural (i.e., cellulose, cotton, wool, etc.) fibrous blankets to insulate buildings or smaller structures.

Heat is transferred between two surfaces having a temperature differential therebetween by three major mechanisms—conduction, convection, and radiation. Thus, in the typical situation, for example, there is air in a gap between two surfaces in a building wall or roof. The insertion of insulation such as glass wool fibers into the gap greatly reduces convection as a heat transport mechanism as the insulation slows or stops the circulation of air. Heat transfer by conduction through the glass fibers themselves, which constitute less than 1% of the total insulated cavity volume, is also minimal. However, most glass compositions used in glass wool insulation products are transparent to portions of the infrared spectrum. Thus, heat transfer by radiation remains a significant mechanism, even where the gap has been insulated, and may account for from about 10 to 40% of the heat transferred between surfaces.

Some attempts have been made to reduce this radiant heat transfer by including certain additives into the glass compositions which would block infrared radiation. Boron has been used for this purpose. However, many of the effective additives are environmentally undesirable as additives to glass. Further, such additives are capable of blocking radiation only in certain small wavelength bands, not across the entire infrared spectrum.

Accordingly, the need still exists in the art for an insulation product which can effectively block the transmission of infrared radiation.

SUMMARY OF THE INVENTION

The present invention meets that need by providing a thermal insulation product which effectively blocks the transmission of infrared radiation through the product. In accordance with one aspect of the present invention, a thermal insulation product is provided and includes, in combination, an insulating material and a chiral polymer adapted to block the passage of a significant portion of the infrared radiation through the insulating material. The insulating material may take any of the conventional forms that insulation has heretofore been used as including fiber batts, powders or small particles, sheets (having either single or multiple layers), and cellular foams of organic or inorganic origin.

In one preferred embodiment, the insulating material comprises a fiber batt, and the fibers are selected from the group consisting of mineral fibers, synthetic polymer fibers, cellulose fibers, and mixtures thereof. The chiral polymer may be included in the insulating material in any of a number of ways to form a composite product. For example, where the insulating material is in the form of a fiber batt, the chiral polymer may be dispersed in the fiber batt. The chiral polymer may also be used as a part of or all of the binder for the fibers in the batt. Alternatively, the chiral polymer may be coated onto the surfaces of the fibers or may be formed into a film which is adhered to one or more surfaces or positioned as a single or multiple layers in the interior of the fiber batt.

In another embodiment of the invention, the insulating material comprises particles or powder which may optionally also be formed into a compressed board. The chiral polymer may be present by being dispersed or blended into the particles, or alternatively, may be coated onto the surfaces of individual particles or onto one or both major surfaces of a compressed insulative board.

In yet another embodiment of the invention, the insulating material comprises a cellular foam formed from an organic (such as a polymer) or inorganic material. Again, the chiral polymer may be present by being dispersed or blended into the polymer being foamed, or alternatively, may be coated onto one or more major surfaces of the foam, or may be formed as a film and adhered to one or more major surfaces of the foam or be positioned as single or multiple layers within the foam.

Chiral materials exist in nature and are characterized by their asymmetry and have either a left-handedness or right-handedness in their structure. One example of a known chiral material on a molecular scale is one type of sugar. When a polarized light beam passes through a solution of this sugar, the light beam rotates through an angle which depends on the sugar molecules spatial configuration and its concentration in the solution. The chiral polymers of the present invention are tailored to interact with radiation in the infrared region of the spectrum by scattering and/or absorbing the infrared radiation. In one embodiment, an appropriately designed and synthesized non-silicone chiral polymer is blended with a silicone polymer and a polysiloxane. The chiral polymer may also be blended with or dispersed in phenolic, urea/formaldehyde, or ester monomers or polymers. Such phenolic, urea/formaldehyde, and polyester resins are used in this art as binders for insulation materials. Preferably, the chiral polymer is selected from the group consisting of polyphosphazenes and doped polyacetylenes.

Accordingly, it is a feature of the present invention to provide a thermal insulation product which effectively blocks the transmission of infrared radiation through the product. This, and other features and advantages of the present invention will become apparent from the following detailed description, the accompanying drawings, and the appended claims.

DETAILED DESCRIPTION OF THE PREFERRED EMBODIMENTS

Figure 1:
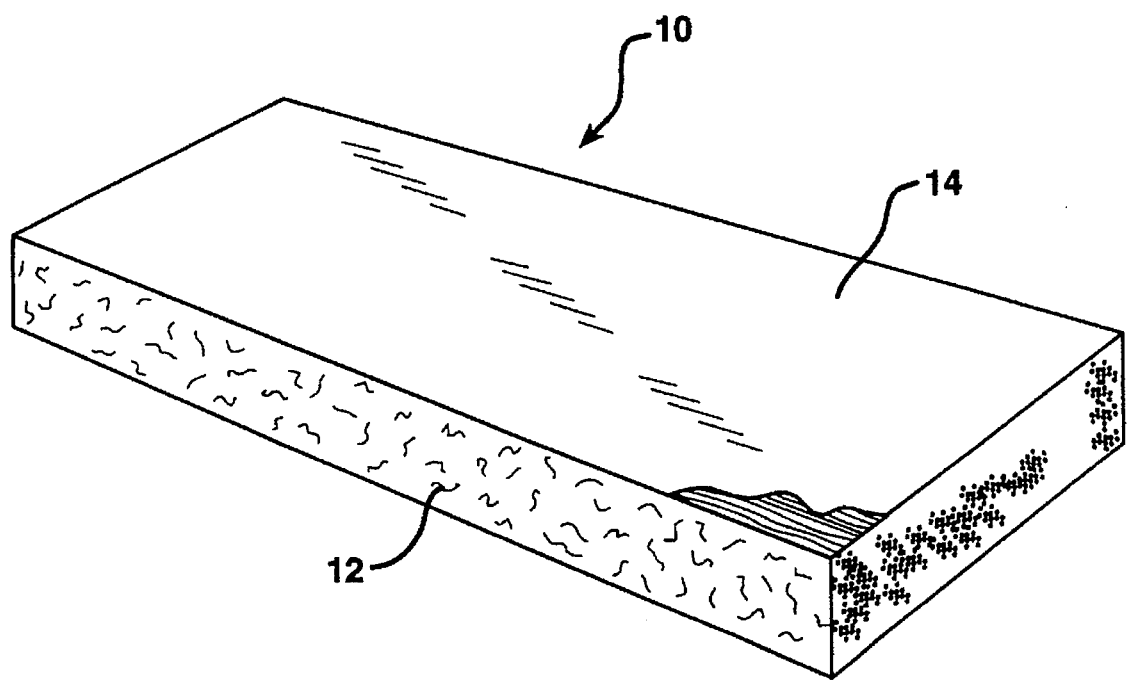
FIG. 1 is a perspective view of a fiber insulation batt having a film of a chiral polymer adhered thereto.

For purposes of this specification, the term "chiral" means the absence of geometric symmetry between an object and its mirror image, and the mirror image of the object cannot be made to coincide with the object itself through any combination of translations or rotations. A "composite"

material is one in which two or more different materials coexist as independent material entities, and one or both materials can exist as either continuous or discontinuous phases. "Infrared frequencies" means electromagnetic wave numbers between about 200 and 4500, and "infrared wavelengths" means electromagnetic wavelengths between 0.7 and 300 microns.

The theoretical basis for the behavior of chiral materials is discussed in greater detail in Varadan et al, U.S. Pat. No. 4,948,922, the disclosure of which is incorporated by reference. Chiral materials are distinguished from ordinary dielectric or magnetic materials by the significance of the second term in the following constitutive relationships:

$$D = \epsilon E + \beta \epsilon \nabla \times E$$

$$B = \mu H + \beta \mu \nabla \times H$$

where E and H are the electric and magnetic fields, respectively, D is the electric displacement, and B is the magnetic intensity. In the equations, $\epsilon$ is the dielectric constant, $\mu$ is the magnetic permeability, and $\beta$ is the chirality parameter. The chirality parameter, $\beta$, is zero for non-chiral materials and non-zero for chiral materials.

Because of these relationships, left and right circularly polarized fields propagate through chiral materials at distinct speeds. Thus, if electromagnetic waves of any polarization encounter a chiral/non-chiral interface, both of the left and right circularly polarized waves are scattered or reflected. In the composite material of the present invention, having chiral polymers distributed within or on the insulating material will cause infrared radiation to become more backscattered as it encounters the multitude of chiral/non-chiral interfaces in the composite. This, in turn, alters the amount of infrared radiation that passes through the insulation and effectively reduces heat flow through the insulation.

As geometry is the basis for the chirality of a composition, the polymers of the present invention are designed to enhance scattering, reflection, and/or absorption of infrared radiation of a wave number of from about 200 to 4500 and a wavelength of from about 0.7 to about 300 microns. Thus, the chain length of the chiral polymers should roughly approximate the wavelengths of interest, namely, from about 0.7 to about 300 microns, on a molecular scale. Thus, a typical polymeric chain, which consists of from about 10,000 to 500,000 molecules in the backbone chain, is in the range which interferes with infrared radiation. For chirality, the polymers of the present invention are designed to have an excess of either right-handedness or left-handedness in the geometry of their microstructures. Racemic mixtures will not function to block infrared radiation. Generally, the chiral polymers of the present invention will have a left- or right-handed helical structure, although other chiral shapes or configurations may be used.

Preferred classes of chiral polymers for use in the present invention include polyphosphazenes and doped polyacetylenes. Polyphosphazenes may be synthesized in accordance with the teachings of H. Allcock, *Chem. Mater.* 1994, 6, 1476–1491. Certain polyphosphazenes such as poly(bis (methoxyethoxy)ethoxyphosphazene) ("MEEP") are also electrically conductive. Polyacetylene chemistry is also well known, as are the techniques for including dopants into the polyacetylene structure which render the polymer electrically conductive. For example, sulfur or a halide ion such as iodine may be included as dopants for inclusion in the polymer.

For the present invention, the chiral polymers may be blended with a silicone polymer and a polysiloxane. Alternatively, the chiral polymers may be blended with phenolics, urea/formaldehydes, and/or polyesters to form binders for the insulation material. In some instances, the chiral polymers may be formed to be a part of an interconnected polymer network with other non-chiral polymers such as the above-mentioned binder materials. Such polymers and their blends may be included as a chiral composite insulating material such as a fiber insulating batt 10 illustrated in FIG. 1. Batt 10 includes fibers 12 which are selected from the group consisting of mineral fibers (including glass and rock wool fibers), synthetic polymer fibers, cellulose fibers, natural fibers (including cotton and wool) and mixtures and blends thereof.

In one embodiment of the invention, chiral polymers are dispersed within the fiber batt 10 during fabrication thereof. Alternatively, the chiral polymers of the present invention may be used or blended with other organic materials, as discussed above, to form a binder for the fibers which is sprayed or otherwise applied to fiber batt 10. In yet another embodiment, the chiral polymers may be coated onto the surfaces of the fibers in fiber batt 10. Further, the chiral polymers may be formed as a sheet or film 14 and adhered to one or more surfaces or in the interior of a fiber batt 10.

Figure 2:
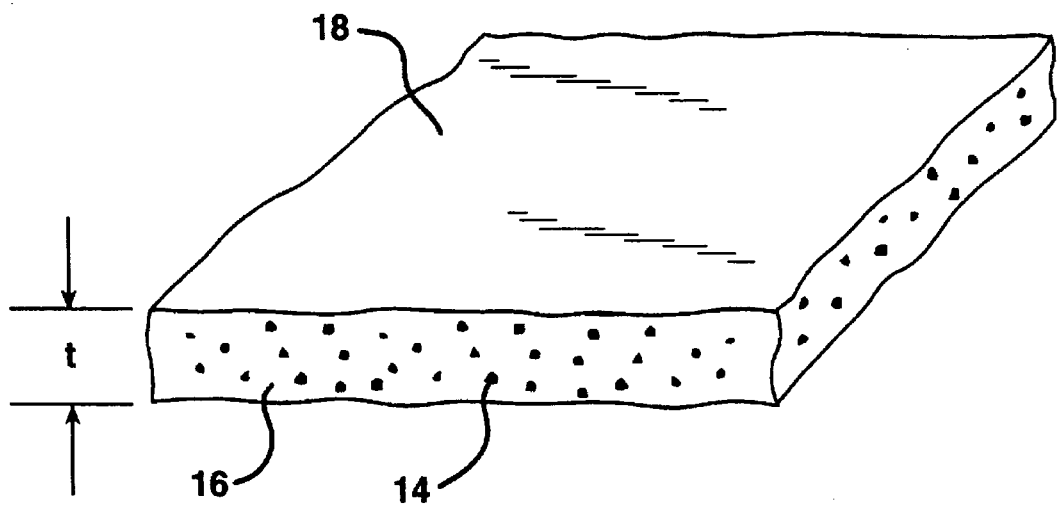
FIG. 2 is a compressed board of a particulate insulating material having a chiral polymer dispersed therein.

In another embodiment of the invention illustrated in FIG. 2, the insulating material is in the form of a powder 16 which is compressed into a board 18. The powder 16 may be any of a number of materials conventionally used in this art including, for example, perlite, vermiculite, ceramics, aerogels, carbon particles such as carbon black, and mixtures thereof. The chiral polymers 14 are again dispersed and blended into the insulating material, or alternatively, may be coated onto the individual particle surfaces or onto one or both major surfaces of the compressed board 18.

Figure 3:
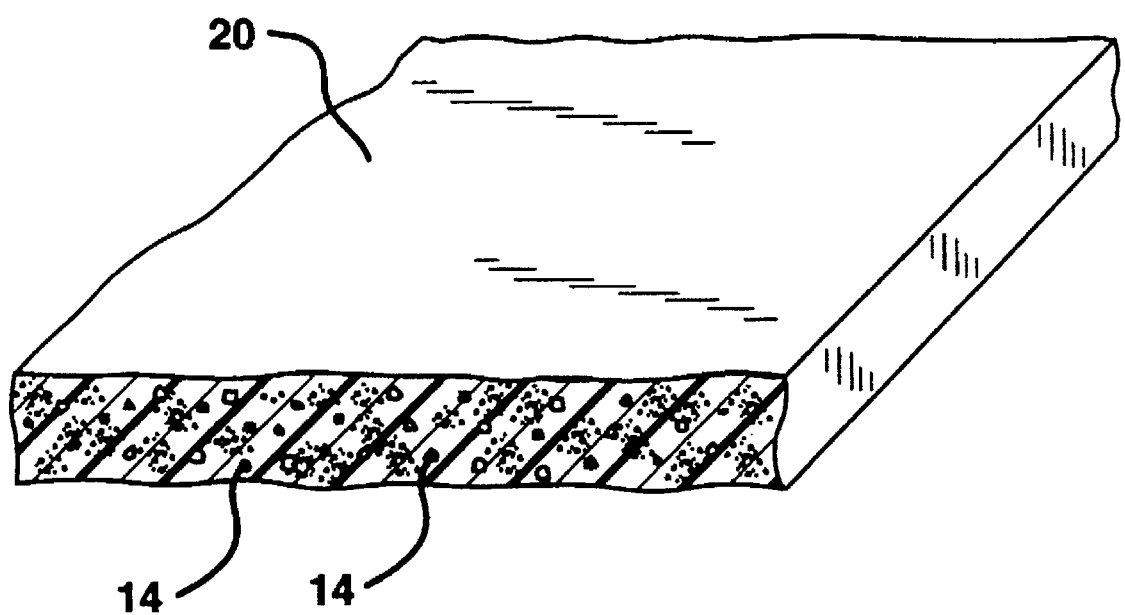
FIG. 3 is a perspective view of a cellular foam insulation having chiral polymer particles dispersed within, or blended as a solution within the foamed material.

FIG. 3 illustrates another embodiment of the invention in which a cellular foam 20 is formed into a board and chiral polymer 14 is dispersed or blended into the foam. Alternatively, chiral polymers 14 may be coated as a film on one or more surfaces of foam board 20 or may be positioned a single or multiple layers within the interior of the foam board.

Preferably, the chiral polymers are added to and/or dispersed in the insulating material in an amount sufficient to provide the scattering of infrared radiation desired. Generally, from about 1 to 20% by weight of a chiral polymer blended with the insulating material produces desirable results.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A thermal insulation product comprising:
   an insulating fiber batt containing fibers selected from the group consisting of mineral fibers, synthetic polymer fibers, cellulose fibers, and mixtures thereof; and
   an infrared radiation blocking material consisting essentially of a chiral polymer selected from polyphosphazenes, wherein the chiral polymer has a chain length of from about 0.7 to about 300 microns and has from about 10,000 to about 500,000 molecules in a backbone chain, and wherein the thermal insulation product is capable of scattering, reflecting or absorbing infrared radiation with a wave number of 200 to 4500 and a wavelength of from about 0.7 to about 300 microns.

2. A thermal insulation product as defined in claim 1, wherein said infrared radiation blocking material further contains a silicone polymer.

3. A thermal insulation product as defined in claim 1, wherein said infrared radiation blocking material further contains a polysiloxane.

4. A thermal insulation product as defined in claim 1, wherein said infrared radiation blocking material is dispersed in said fiber batt.

5. A thermal insulation product as defined in claim 1, wherein said infrared radiation blocking material is present in said fiber batt as a binder for the fibers.

6. A thermal insulation product as defined in claim 1, wherein said infrared radiation blocking material is coated on surfaces of the fibers.

7. A thermal insulation product as defined in claim 1, wherein said infrared radiation blocking material is in the form of a film adhered to said fiber batt or to a layer of fibers of said fiber batt.

8. A thermal insulation product as defined in claim 1, wherein said infrared radiation blocking material further contains at least one resin selected from the group consisting of phenolic resins, urea/formaldehyde resins, and polyester resins.

9. A thermal insulation product comprising:

an insulating fiber batt containing fibers selected from the group consisting of mineral fibers, synthetic polymer fibers, cellulose fibers, and mixtures thereof; and an infrared radiation blocking material consisting essentially of poly(bis(methoxyethoxy)ethoxyphosphazene).

* * * * *